Dec. 29, 1936.　　　A. H. ORCUTT　　　2,066,220
MACHINE FOR GRINDING GEAR WHEELS
Filed Oct. 23, 1935　　　6 Sheets-Sheet 1

Dec. 29, 1936. A. H. ORCUTT 2,066,220
MACHINE FOR GRINDING GEAR WHEELS
Filed Oct. 23, 1935 6 Sheets-Sheet 6

A. H. Orcutt
INVENTOR by Glascock Downing Seebold
Attys.

Patented Dec. 29, 1936

2,066,220

UNITED STATES PATENT OFFICE 2,066,220

MACHINE FOR GRINDING GEAR WHEELS

Arthur Hitchcock Orcutt, Handsworth, Birmingham, England, assignor to The Gear Grinding Company, Limited, Birmingham, England Application October 23, 1935, Serial No. 46,423
In Great Britain October 26, 1934

3 Claims. (Cl. 51—123)

This invention relates to machines for grinding the teeth of so-called helical gear wheels, that is to say wheels in which the teeth are disposed at an angle to the axis of revolution. The machines with which the invention is concerned are of the type in which two adjacent faces of the wheel teeth are ground simultaneously by a rotary wheel having a suitably formed periphery, the work piece (or the grinding wheel) being given a combined sliding and rotational movement during the grinding operation to bring the whole length of the tooth faces under the action of the grinding wheel. After each grinding operation an indexing movement is given to the work piece to bring the next pair of faces into position for treatment by the grinding wheel.

The object of the present invention is to provide improved means for effecting the required angular or rotational movement of the work piece during each grinding operation, and for effecting the required indexing movements.

The invention comprises the combination with a rotatable work holder having an indexing mechanism associated with it, of a rack and pinion mechanism through which the work holder can be given a rotational movement, and an abutment for imparting movement to the rack, this abutment being inclined to the axis of the work piece so that by relative sliding movement of the work piece and abutment the work piece is given the required rotational movement. Further the invention comprises means as hereinafter described for eliminating slackness between the teeth of the rack and of the pinions engaged by the rack. Further the invention comprises the combination with the aforesaid mechanism for rotating the work piece, of indexing mechanism as hereinafter described.

In the six accompanying sheets of explanatory drawings:—

Figure 3:
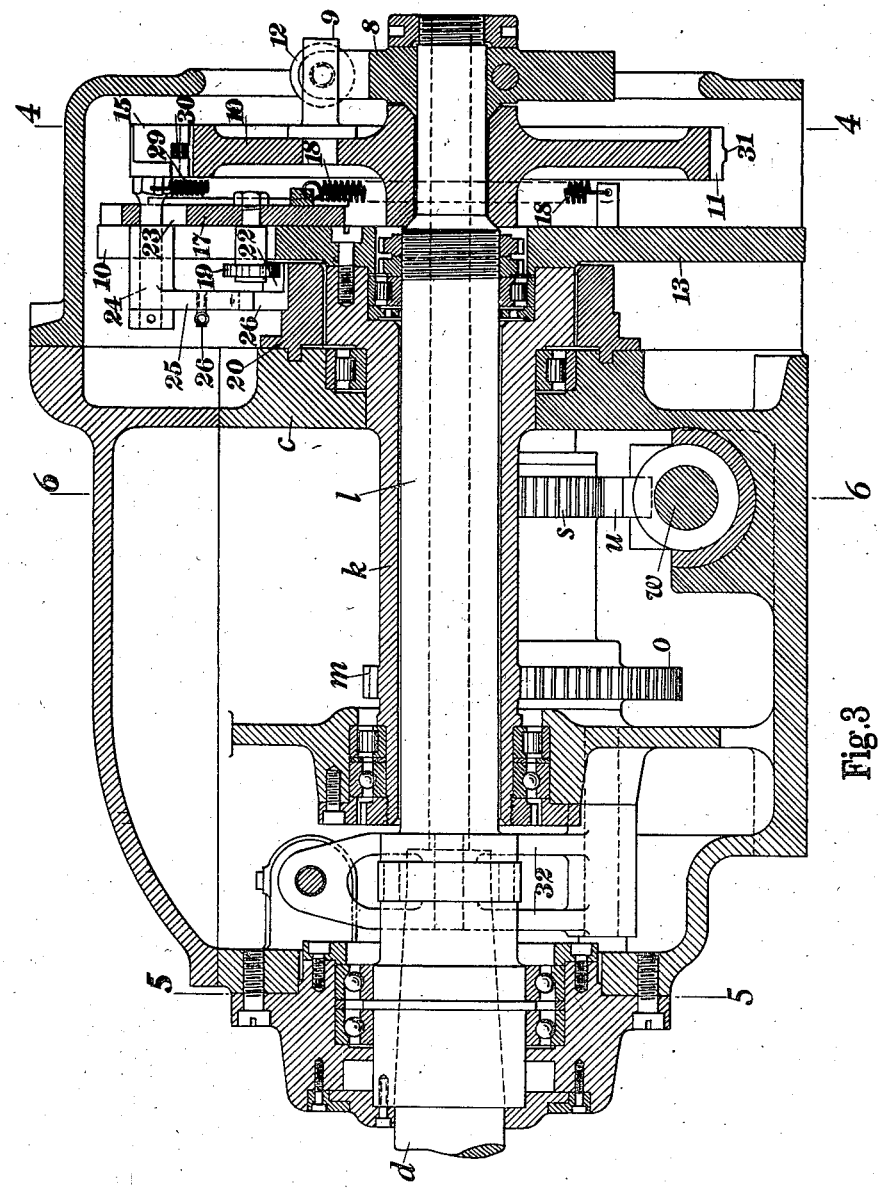
Figure 3 is a longitudinal section through the hollow spindle of the headstock.
Figure 4:
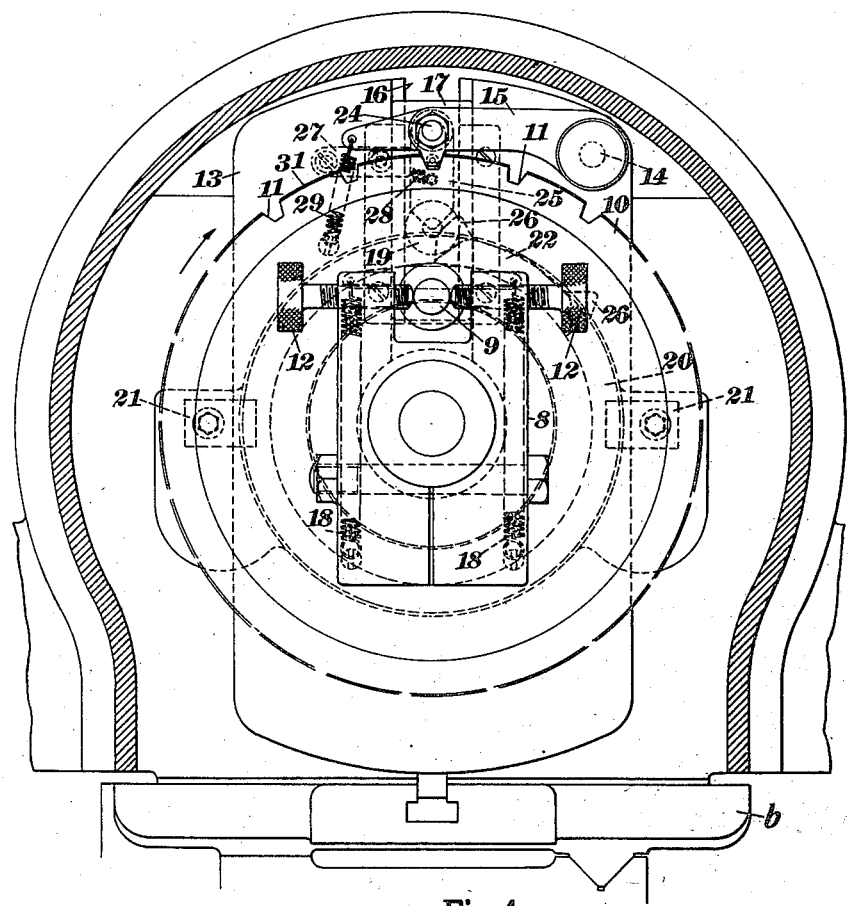
Figure 5:
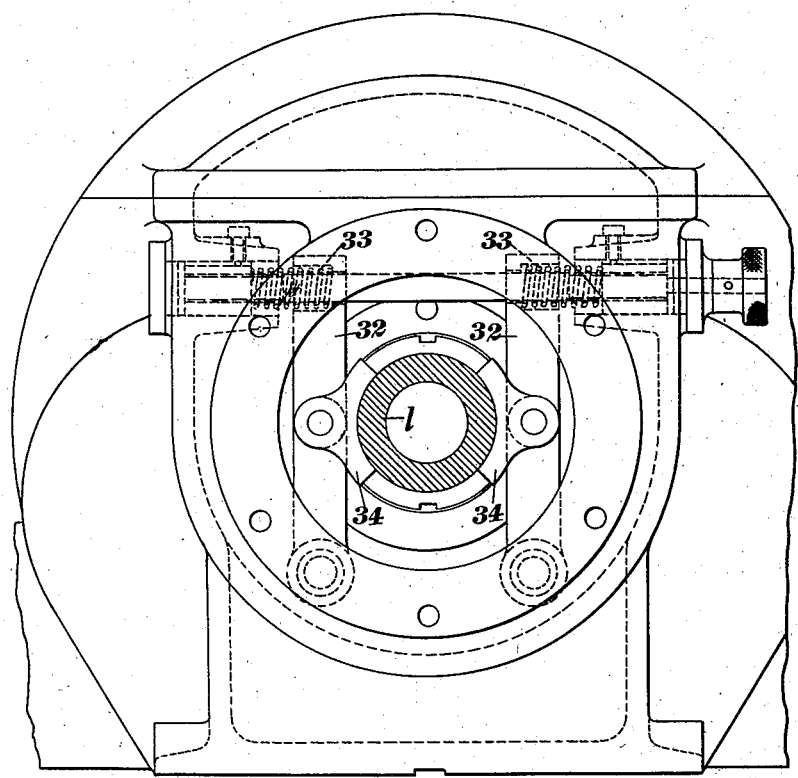
Figure 6:
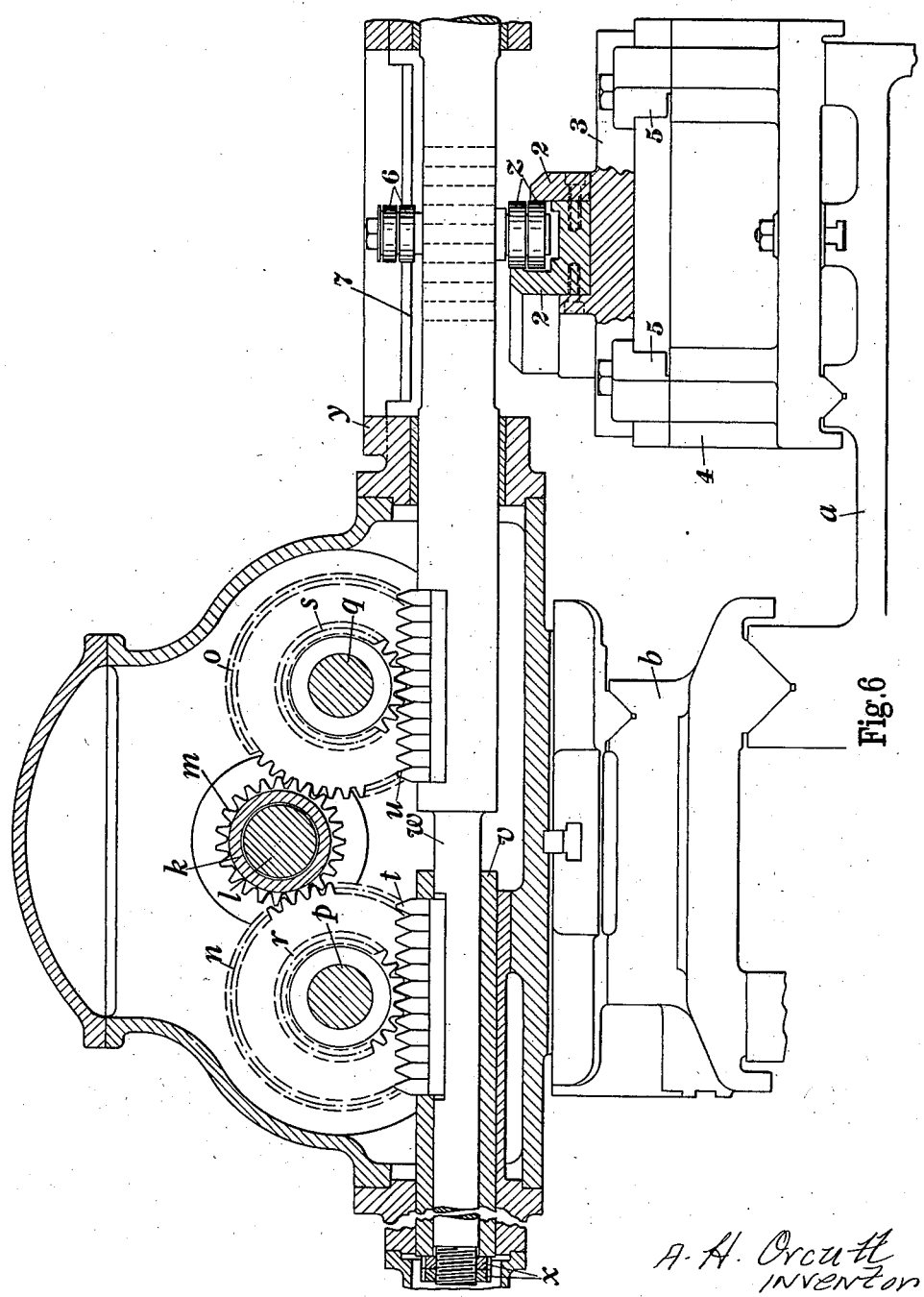

Figures 4, 5 and 6 are respectively cross sections on the lines 4.4, 5.5, and 6.6 (Figure 3).

Figure 1:
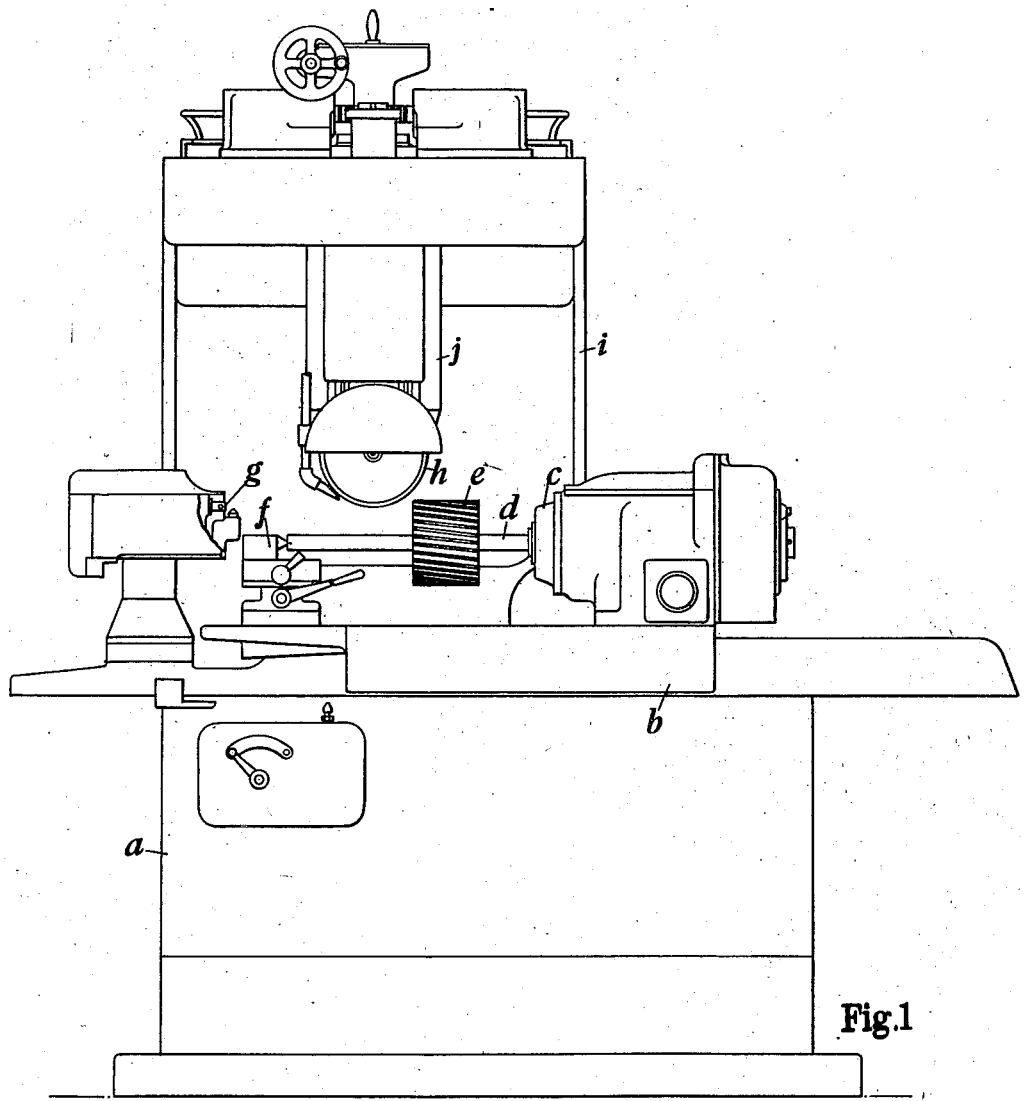
Figure 1 is a front view showing diagrammatically one form of toothed-wheel grinding machine to which my present invention is applicable.

The wheel grinding machine shown diagrammatically in Figure 1 is one in which there is mounted on a base $a$ a horizontally movable slide $b$. This latter is provided with a headstock $c$ for carrying one end of a spindle $d$ on which is mounted the work piece $e$, the other end of the spindle being supported by a part $f$. Also the slide carries a device $g$ which is used periodically for trimming the grinding wheel $h$. Reciprocation of the slide $b$ on the bed $a$ is effected in any convenient manner. Above the bed is arranged a frame $i$ from which depends a support $j$ carrying at its lower end the rotary grinding wheel $h$. The side faces of the grinding wheel are accurately shaped to the form required to be produced on the faces of the teeth on the work piece $e$. The teeth on the work piece are, as indicated in Figure 1, inclined to the axis of rotation of the work piece, and one of the purposes of the mechanism to be described is to give the work piece a rotational movement while it is being carried by the slide $b$ past the grinding wheel $h$.

Figure 2:
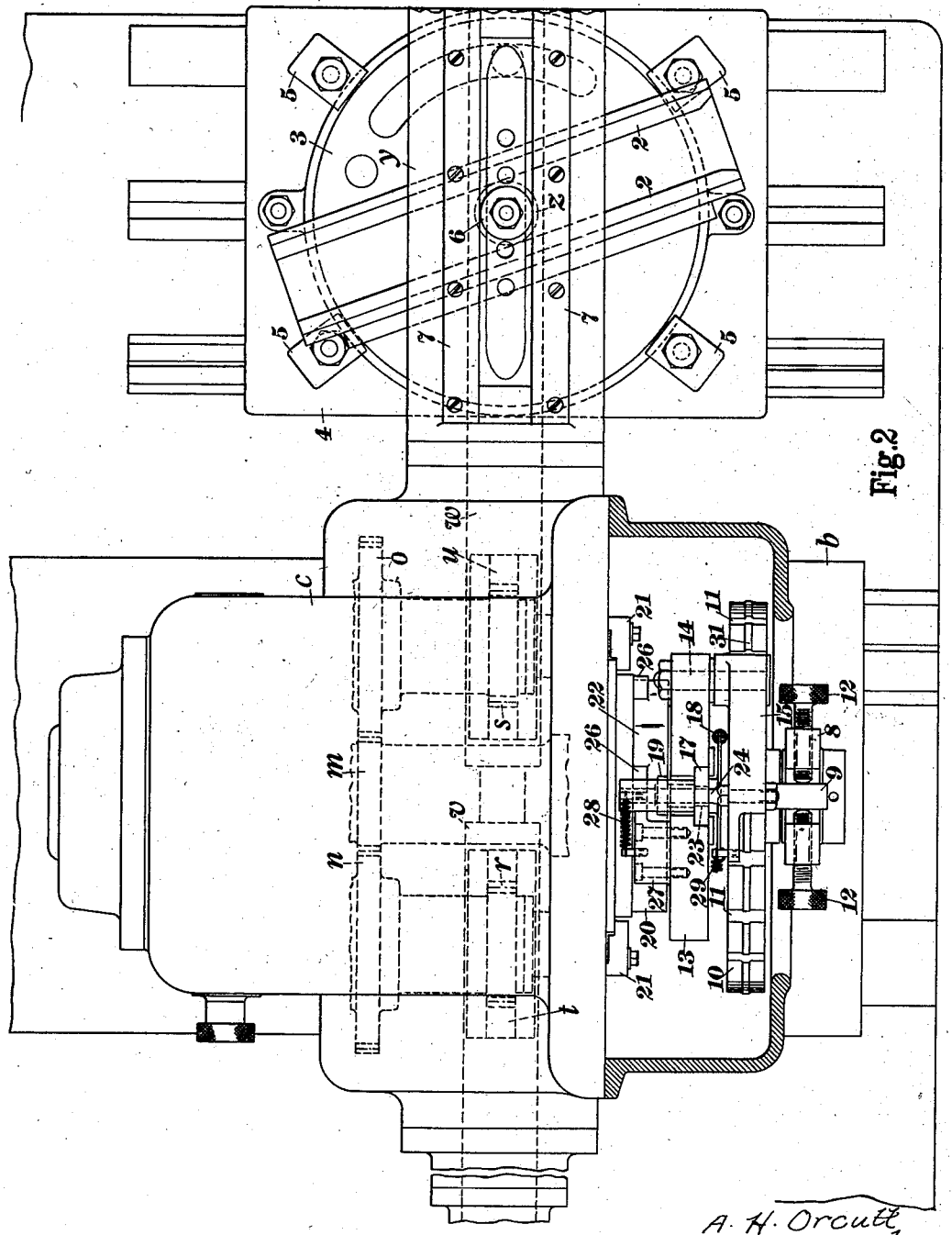
Figure 2 is a plan of a slidable headstock constructed in accordance with this invention and adapted for use in such a machine as is shown in Figure 1.

Referring now to Figures 2–6, there is arranged in the headstock $c$ a hollow spindle $k$ within which is arranged another hollow spindle $l$. One end of the latter is adapted to receive one end of the arbor $d$ carrying the work piece. The two spindles $k$, $l$, are interconnected through the indexing mechanism shown at the right hand side of Figure 3. This mechanism, which will be described in detail later, is also shown in Figures 2 and 4. For rotating the spindles $k$, $l$, the spindle $k$ is provided with a pinion $m$, and this engages a pair of pinions $n$, $o$, on spindles $p$, $q$. The pinions $n$, $o$, are respectively formed integrally with or are secured to smaller pinions $r$, $s$, which engage racks $t$, $u$. By suitably proportioning the relative diameters of the various pinions I am able to get the desired rotational movement of the work piece with a small inclination of the abutments to be described later. The reason for employing two racks ($t$, $u$) and two pinions $n$, $o$, for actuating the single pinion $m$ is that this enables me in a ready and convenient manner to eliminate slackness between the various teeth on the parts $t$, $u$, $r$, $s$, $n$, $o$, and $m$. In the example illustrated, the rack $t$ is carried by a sleeve $v$ on the part $w$ carrying the rack $u$, and at the left hand end of the part $w$ (which is screw threaded) there are mounted a pair of nuts $x$, one of which abuts against the adjacent end of the sleeve $v$. When making the initial adjustment of the mechanism above described, the sleeve $v$ is moved under the action of one of the nuts along the part $w$ sufficiently to take up all slackness between the teeth of the various racks and pinions above-mentioned, and after this adjustment has been made the other nut $x$ (which serves as a lock nut) is tightened to prevent accidental disturbance of the adjustment.

One end of the part $w$ is extended as shown and is supported in a bearing $y$ projecting from one side of the headstock $c$, and on this extended portion of the part $w$ are carried a pair of rollers $z$ which respectively abut against a pair of straight bars 2 (herein termed abutments). These abutments are parallel with each other and are carried on a circular base 3 which is secured to a support 4 adapted to be secured at any desired position on the bed $a$ of the machine. The base 3 is rotatably adjustable on the support 4 so that the abutments 2 can be adjusted to any desired inclination relatively to the axis of the work spindle $d$, and after the adjustment has been made, it is secured by clamps 5.

To give lateral support to the extended portion of the member $w$, it is provided with rollers 6 which abut against the sides of strips 7 secured to the bearing $y$.

The headstock $c$ is secured to slide $b$ in any convenient manner. When making the initial adjustments of the machine to suit a particular work piece the support 4 is moved to and secured in a suitable position on the bed $a$ of the machine. Further the abutments 2 are rotated relatively to the support 4 until the faces with which the rollers $z$ co-operate are brought to the required angle and are then secured. The required arrangement of the abutments is such that when the slide $b$ is moved along the bed $a$, a sufficient lateral movement is given to the rack member $w$ by the action of the abutments 2 on the rollers $z$ to rotate the work piece through the required angular distance.

It will be understood that in each reciprocation of the slide $b$ on the bed $a$ the work piece is subjected to a grinding action of the wheel $h$, and during such action a rotational movement is given to the work piece, this movement being necessitated by the inclination of the teeth of the work piece. After each grinding operation the work piece is moved through an appropriate angular distance to bring the gap between the next pair of teeth into position for the next grinding operation. This movement is termed the indexing movement, and is intermittently repeated until all the teeth on the work piece have been treated. The indexing mechanism will now be described.

On the outer end of the inner spindle $l$ is secured a plate 8 formed with a gap in which lies a projection 9 from an indexing plate 10 freely mounted on the spindle $l$. The periphery of the indexing plate is formed with suitably spaced notches 11 corresponding in number to the number of teeth on the work piece. To secure the indexing plate 10 to the plate 8, the latter is provided with a pair of clamping screws 12 which engage the projection 9. This device serves not only to secure the plate 10 to the plate 8, but also allows an angular adjustment to be made between the plate 10 and the spindle $l$. On the outer spindle $k$ there is secured a plate 13 on which is pivoted at 14 a pawl 15 for engaging any one of the notches 11 in the plate 10. Also the plate 13, herein termed the driving plate, is formed with a gap 16, over which there is carried on the said plate a slide 17 which is acted on by strong springs 18 attached to the driving plate. The slide 17 is provided on one side with a roller 19 which can move around the periphery of a ring 20 adjustably secured by clamps 21 on the adjacent end of the headstock $c$. On the periphery of this ring is secured a cam 22 with which the roller 19 can engage at a certain position in the indexing movement. Further the slide 17 is formed with a slot 23 through which passes a pin 24 attached at one end to the pawl 15, and on this pin is pivotally mounted a pawl lifting piece 25 which is actuated by engagement with one of a pair of projections 26 formed on the cam 22. The lifting piece 25 is free to swing on the pin 24 in one direction only and is held against movement in the opposite direction by a stop 27 secured on the driving plate 13, the part 25 being held in contact with this stop by a spring 28.

The amount of reciprocatory movement given to the slide $b$ relatively to the grinding wheel $h$ is in excess of that required to grind the teeth of the work piece, and the excess movement is utilized to operate the indexing mechanism. To elucidate the action of the indexing mechanism, it will be convenient to assume that the slide $b$ is in the position shown in Figure 1 and is still moving to the right. As soon as the grinding wheel is clear of the work piece $e$, the roller 19 will be in contact with the end of the cam 22 and the driving plate 13 will be moving in the direction indicated by the arrow in Figure 4 under the action of the rollers $z$ and abutments 2. With the continued movement of the driving plate in that direction, the roller 19 will ride up the cam and lift the slide 17, this movement serving only to relieve the pawl 15 from the load exerted by the springs 18. Now the lifting piece 25 will strike the adjacent projection 26, and because it is held against movement on the pin 24 by the stop 27, it will ride up the projection and lift the pawl 15 clear of the indexing plate. The spindle $l$ carrying the work piece is now free, and to prevent its continued movement under its inertia, I provide in combination with that spindle a continuously acting friction brake which is situated at the left hand end of the headstock in Figure 3 and will be described in detail later. The driving plate 13 will continue to move in the direction of the arrow (Figure 4) until the pawl drops into engagement with the next notch in the indexing plate 10. This occurs at the end of the movement of the slide $b$. The pawl 15 is caused to engage the notch in the indexing plate under the action of a light spring 29, the strong springs 18 being still held out of action by the slide 17, roller 19 and cam 22. To avoid wearing of the pawl by rubbing over the periphery of the indexing plate 10 I provide the portion of the pawl which enters the notches with a roller 30 and this roller is arranged to bear on a track 31 on the periphery of the said plate.

The slide $b$ will now commence its reverse movement and at the moment before the grinding wheel $h$ enters the work piece $e$ the pawl lifting piece 25 passes idly over the projection 26, and subsequently the roller 19 passes off the cam 22, so allowing the slide 17 to return under the action of the springs 18. The said springs now hold the pawl 15 securely in engagement with the indexing plate 10, through the medium of the slide 17 and pin 24. Continued movement of the slide $b$ carries the work piece past the grinding wheel $h$, the work piece being rotated during this movement in the manner already described, and at the end of the following return movement of the slide the indexing action is repeated.

When the inclination of the teeth of the work piece is opposite to the one shown in Figure 1, it is necessary to reverse the inclination of the abutments 2 relatively to the support 4. It is also necessary to cause the indexing action to occur when the driving plate 13 is moving in the opposite direction to that indicated by the arrow in Figure 4. This is readily effected in the mechanism already described, by releasing the clamps 21 which hold the ring 20, and rotating the said ring to a suitable position in which the cam 22 and the second projection 26 lie on the opposite side of the vertical centre line in Figure 4, the ring 20 being then re-secured by the clamps 21. Also the stop 27 and spring 28 are moved to the opposite position on the driving plate so that the stop then acts on the opposite side of the striking piece.

As already mentioned the spindle $l$ is subjected to the continued action of a friction brake to prevent over-running of the spindle during the indexing movement. This brake is shown in Figures 3 and 5 and comprises a pair of brake shoes 34 carried on levers 32 which are acted on by springs 33, the shoes being arranged to bear against opposite sides of the spindle $l$.

By this invention I am able to effect the required rotational movements of the work pieces during and between the grinding operations in a very ready and convenient manner.

Having thus described my invention what I claim as new and desire to secure by Letters Patent is:—

1. In a toothed wheel grinding machine of the type specified, the combination with a rotatable work holder having an indexing mechanism associated with it, of a pinion on the said holder, a pair of pinions acting on different parts of the first pinion, a pair of relatively adjustable racks, and an inclined abutment for actuating the racks, substantially as described.

2. In a toothed wheel grinding machine of the type specified, the combination with a rotatable work holder having an indexing mechanism associated with it, of a pinion on the work holder, a pair of pinions acting on different parts of the first pinion, a pair of relatively adjustable colinear racks one of which is slidable relatively to the other, means for securing the racks in the required relationship, and an inclined abutment for actuating the racks, substantially as described.

3. In a toothed wheel grinding machine of the type specified, the combination with a rotatable work holder having an indexing mechanism associated with it, of a pinion on the work holder, a pair of pinions acting on different parts of the first pinion, a pair of relatively adjustable racks, a pair of pinions engaged by the racks and arranged in operative connection with the first pair of pinions, and an inclined abutment for actuating the racks, substantially as described.

ARTHUR HITCHCOCK ORCUTT.